Feb. 7, 1961 H. M. GEYER 2,970,573
ACTUATOR WITH STROKE END LOCKS
Filed Feb. 18, 1959 3 Sheets-Sheet 1

INVENTOR.
Howard M. Geyer
BY
W. E. Finken
His Attorney

Feb. 7, 1961 H. M. GEYER 2,970,573
ACTUATOR WITH STROKE END LOCKS
Filed Feb. 18, 1959 3 Sheets-Sheet 2

INVENTOR.
Howard M. Geyer
BY
W. E. Finken
His Attorney

Feb. 7, 1961
H. M. GEYER
2,970,573
ACTUATOR WITH STROKE END LOCKS
Filed Feb. 18, 1959
3 Sheets-Sheet 3
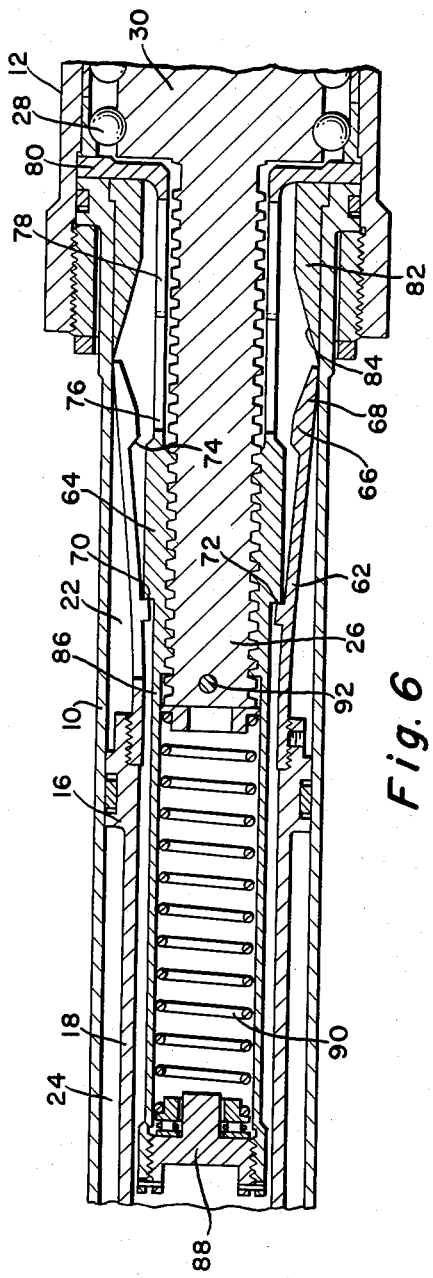
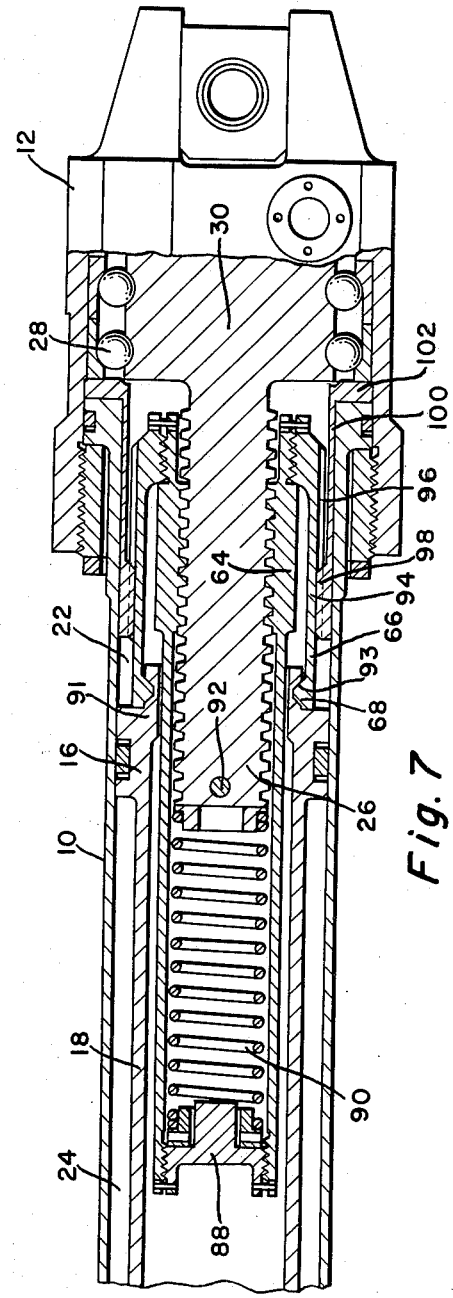
INVENTOR.
Howard M. Geyer
BY
*W. E. Finken*
His Attorney United States Patent Office 2,970,573
Patented Feb. 7, 1961

2,970,573
ACTUATOR WITH STROKE END LOCKS
Howard M. Geyer, Dayton, Ohio, assignor to General Motors Corporation, Detroit, Mich., a corporation of Delaware Filed Feb. 18, 1959, Ser. No. 794,113
20 Claims. (Cl. 121—49)

This invention pertains to fluid pressure operated linear actuators, and particularly to linear actuators including stroke end locking means.

In my previous Patent #2,815,005, a fluid pressure operated linear actuator having stroke end locking means is disclosed. The stroke end locking means are of the dog tooth type and in some instances, must be released under load thereby subjecting the dog teeth to shearing forces of considerable magnitude, which forces in some instances can damage the edges of the dog teeth. The present invention relates to stroke end locking means of the dog tooth type which are not subjected to shearing forces upon release thereby precluding damage to the dog tooth locking elements. Accordingly, among my objects are the provision of a fluid pressure operated actuator including releasable stroke end locking means; the further provision of a fluid pressure operated linear actuator including stroke end locking means which are not subjected to shear loads during release; the further provision of stroke end locking means for a linear actuator including a piston wherein the dog tooth member is carried by the piston; and the still further provision of stroke end locking means for an actuator including a piston wherein the dog tooth member is carried by a nut.

The aforementioned and other objects are accomplished in the present invention by incorporating a rotary screw shaft in the actuator cylinder in combination with means for locking the screw shaft against rotation in one direction. Specifically, two embodiments of an improved stroke end locking means for fluid pressure operated linear actuators are disclosed herein. In both embodiments, the actuator includes a cylinder having a reciprocable piston disposed therein capable of fluid pressure actuation in both directions. The piston includes a rod portion which extends through one end of the cylinder for attachment to any suitable load device. In the present instance, the actuators are designed to position a load device which exerts a tension load on the actuator piston, that is, a load tending to extend the actuator piston.

In both embodiments, a short screw shaft is rotatably journalled in the cylinder, the screw shaft engaging a nonrotatable but axially movable nut. In both embodiments, the screw shaft can be locked against rotation in one direction when the actuator is in the fully retracted position, the screw shaft locking means being automatically released upon the application of fluid under pressure to the extend chamber of the actuator.

In one embodiment, the piston has a dog tooth locking member attached thereto comprising an annulus with a plurality of circumferentially spaced, radially expansible locking fingers having dog teeth adjacent their ends. In this embodiment, the nut is formed with a complementary locking surface and a sleeve having a tapered, or frusto conical edge is affixed to the cylinder and guides the locking fingers into engagement with the cooperating locking surface on the nut when the actuator piston is moved to the fully retracted position.

When the actuator is in the fully retracted position, the piston cannot be extended since the dog teeth on the piston carried sleeve engages the nut, the nut is restrained against rotation, and the screw shaft is locked against rotation. Upon the application of fluid under pressure to the extend chamber, the unidirectional locking means on the screw shaft are simultaneously released thereby permitting rotation of the screw shaft and linear movement of the nut and piston. Accordingly, the dog tooth stroke end locking means will be released without subjecting the faces of the dog teeth to shear forces, and as soon as the dog teeth are disengaged from the nut, piston reciprocation is not dependent upon rotation of the screw shaft or linear movement of the nut.

In the second embodiment, an annulus having a plurality of axially extending radially expansible fingers is attached to the nut, dog teeth being formed adjacent the ends of the fingers. The dog teeth are engageable with a complementary locking surface formed on an extension of the piston. The nut and dog tooth locking member are restrained against rotation at all times, although free to move axially a limited distance. When the actuator is fully retracted with the stroke end locking means engaged, the screw shaft is locked against rotation in one direction. Upon the application of fluid under pressure to the extend chamber, the screw shaft is simultaneously released whereupon linear movement of the piston in the extend direction will impart axial movement to the nut and rotation to the screw shaft. After a predetermined linear movement of the piston and nut, the dog tooth locking means will be released without subjecting the dog tooth surfaces to shear forces.

Further objects and advantages of the present invention will be apparent from the following description, reference being had to the accompanying drawings, wherein preferred embodiments of the present invention are clearly shown, and wherein like numerals denote like parts throughout the several views.

In the drawings:

Figure 6 is a fragmentary, sectional view of the actuator of Figure 1 with the stroke end lock released.

Figure 7 is a fragmentary sectional view of a modified actuator construction.

Figure 1:
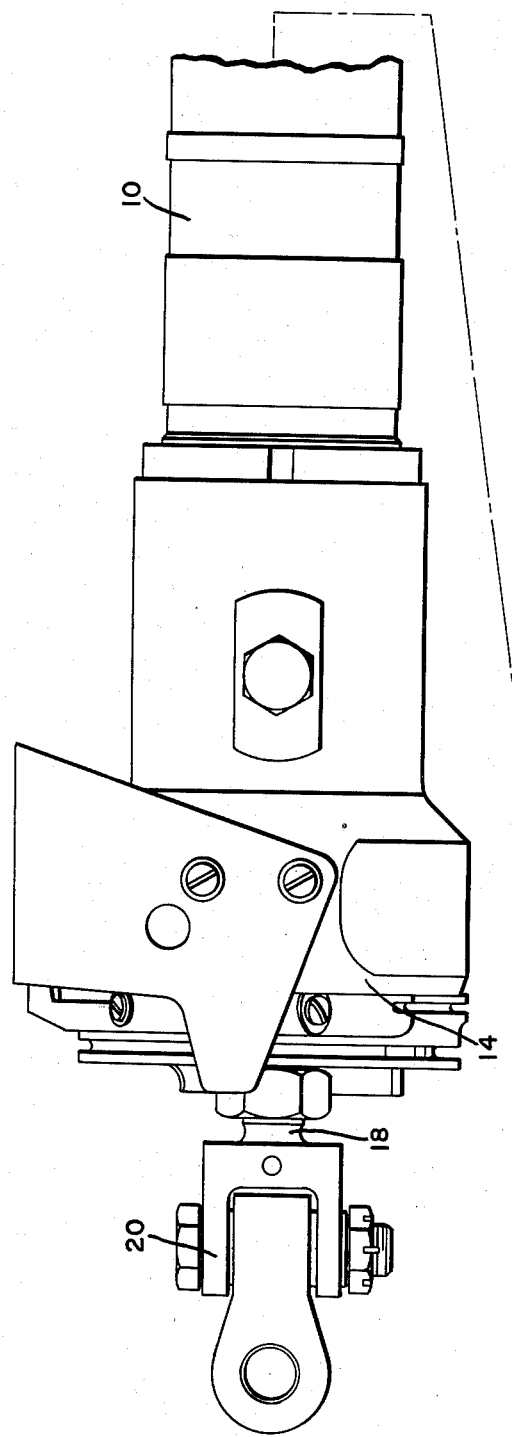
Figure 1 is a view, partly in section and partly in elevation, of an actuator constructed according to one embodiment of the present invention.
Figure 1:
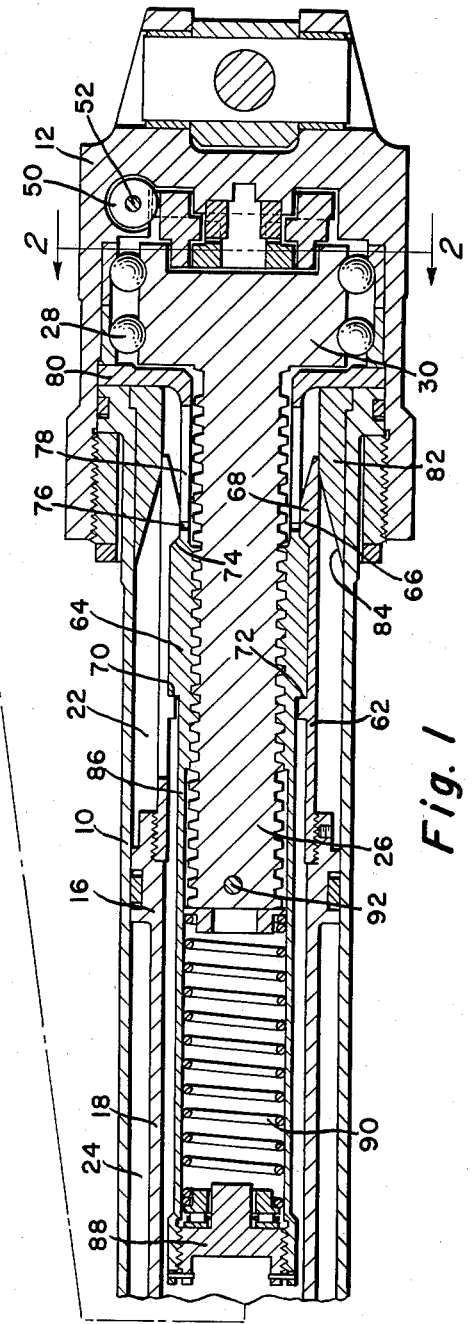

With particular reference to Figure 1, in the first embodiment the actuator comprises a cylinder 10 having a head cap 12 and a tail cap 14 attached thereto. A reciprocable piston 16 having an integral hollow axially extending rod 18 is disposed within the cylinder 10, the hollow rod 18 extending through the tail cap 14. The external portion of the rod 18 has a clevis 20 attached thereto, whereby the rod can be connected to any suitable load device, not shown.

The piston 16 divides the cylinder 10 into an extend chamber 22 and a retract chamber 24. The retract chamber 24 communicates with a suitable port, not shown, in the tail cap 14 through which fluid under pressure can be supplied and drained to the retract chamber 24. Similarly, the extend chamber 22 communicates with a suitable port, not shown, in the head cap 12 through which fluid under pressure can be drained and supplied to the extend chamber.

A relatively short Acme screw shaft 26 is rotatably journalled by ball bearing means 28 in the head cap 12, the screw shaft 26 extending into a cylinder 10. The screw shaft 26 is integral with a locking collar, or annulus, 30 adjacent the bearing supported end thereof, which locking collar forms a component of a roller type, unidirectional lock which is operable, when engaged, to prevent rotation of the screw shaft in one direction.

Figure 2:
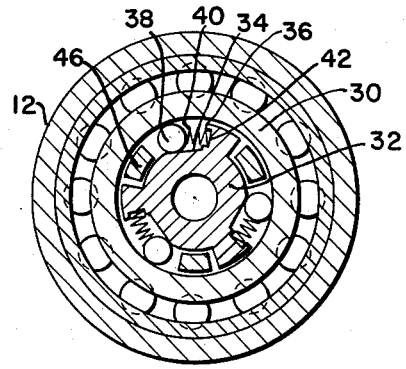
Figure 2 is a sectional view taken along line 2—2 of Figure 1.

As seen in Figure 2, the roller locking means for the screw shaft 26 includes a stationary cam member 32 suitably connected to the head cap 12. The cam member has three peripheral flats 34 which terminate in abrupt shoulders 36. A roller 38 is supported on each flat 34, the rollers being urged away from the shoulders 36 by coil springs 40. One end of each coil spring 40 is disposed within a bore 42 in the cam member 32, and the other end of each spring 40 engages its respective roller 38. The springs 40 normally maintain the rollers 38 in wedging engagement between the flats 34 and the inner periphery of the locking collar 30 which is integral with the screw shaft 26 so as to prevent rotation of the locking collar 30, and hence the screw shaft 26, in the counterclockwise direction as viewed in Figure 2. Obviously, the rollers 38 do not at any time prevent rotation of the collar 30 and the screw shaft 26 in the clockwise direction, as viewed in Figure 2. In order to release the roller lock associated with the screw shaft 26 so as to permit rotation thereof in the counterclockwise direction, an angularly movable lock releasing collar 44 having three axially extending fingers 46 is disposed between the arcuate surfaces of the cam 32 and the locking collar 44.

Figure 3:
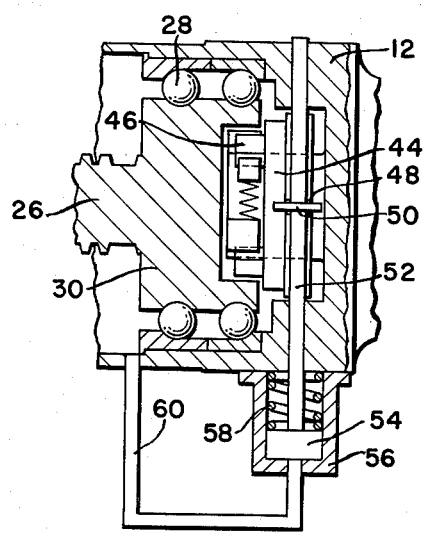
Figure 3 is a fragmentary schematic view of the one-way collar lock mechanism.

With reference to Figure 3, the lock releasing collar 44 has a single peripheral notch 48 which receives a one tooth rack 50 integral with a piston rod 52. The piston rod is attached to a piston 54 disposed within a cylinder 56 aligned generally transversely relative to the cylinder 10 within the head cap 12. A coil spring 58 engages the rod end of the piston and the cylinder end wall and normally maintains the piston 50 and the lock releasing collar 44 in the lock engaged position. However, upon application of fluid under pressure to the cylinder 58, the piston 56 will be moved upwardly, as viewed in Figure 3, thereby imparting clockwise angular movement to the fingers 46, as viewed in Figure 2, so as to release the roller lock and permit counterclockwise rotation of the screw shaft 26. As shown in Figure 3, the cylinder 58 is connected to the extend chamber 22 of the actuator by a conduit 60 whereby the unidirectional locking means for the screw shaft will be released simultaneously with the application of pressure to the extend chamber 22.

Figure 4:
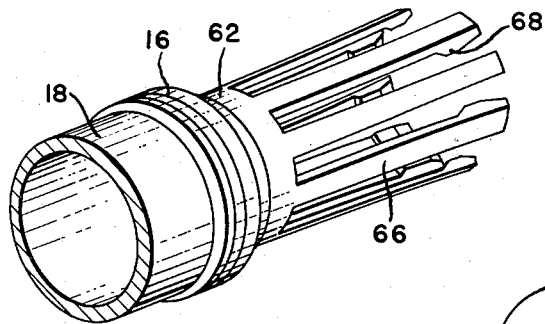
Figure 4 is a perspective view of the stroke end locking means.
Figure 5:
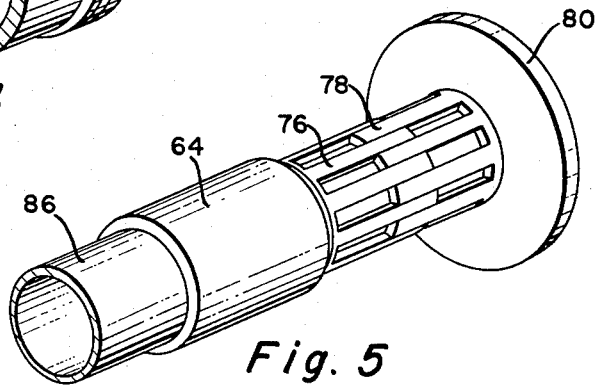
Figure 5 is a perspective view of the nut assembly.

As alluded to hereinbefore, the actuators of the present invention include stroke end locking means for locking the piston in the fully retracted position, as shown in Figure 1, so as to prevent extending movement of the actuator piston under tension load. The stroke end locking means are of the dog tooth type and include an annulus 62 attached to the piston 16 and a nut 64 which threadedly engages the screw shaft 26. The annulus 62 is formed with a plurality of circumferentially spaced axially extending fingers 66 having radially inwardly extending dog teeth 68, as seen in Figure 4. The fingers 66 inherently tend to expand outwardly into engagement with the inner periphery of the cylinder 10. In addition, the annulus 62 is formed with an internal shoulder 70 adapted to engage an external shoulder 72 formed on the nut 64. The nut 64 is formed with a complementary dog tooth surface 74, and a plurality of circumferentially spaced longitudinally extending teeth 76, as shown in Figure 5. The teeth 76 on the nut 64 are received in complementary slots formed in the skirt portion 78 of the flanged annulus 80 which is restrained against rotation relative to the head cap 12. Accordingly, the nut 64 is restrained against rotation while free to move axially.

A stationary sleeve 82 is disposed within the cylinder, the sleeve 82 having a frusto conical, or tapered, edge portion 84 for guiding the dog tooth ends of the fingers 66 into engagement with the end of the nut 64. The nut 64 is formed with a sleeve extension 86 disposed coaxially of the piston rod 18, a spring retainer 88 being attached to the outer end of the sleeve 86. A coil spring 90 has one end engaging the retainer 88 and the other end of the screw shaft 26. The spring 90 tends to urge the nut 64 to the left, as viewed in Figure 1, and maintains the nut in engagement with a cross pin 92 adjacent the end of the screw shaft 26 when the piston is extended. The pin 92 engages the end thread of the nut 26 and operates as a torque stop for the screw shaft. In operation, with the actuator fully retracted and the stroke end locking means engaged, as shown in Figure 1, the actuator piston is held against movement to the left, by the stroke end lock as long as the roller locking means for the screw shaft 26 are engaged. Upon application of fluid under pressure to the extend chamber 22 while the retract chamber 24 is connected to drain, the roller locking means for the screw shaft 26 are released. Accordingly, the piston 16 can move to the left, as viewed in Figure 1, and in so doing will impart axial movement to the nut 64. Axial movement of the nut 64 is dependent upon rotation of the screw shaft 26. As soon as the nut 64 is moved to the left so as to engage the cross pin 92, the dog tooth fingers 68 can expand outwardly into engagement with the inner wall of the cylinder 10. Accordingly, the dog tooth stroke end locking means will be released, as shown in Figure 6, and during continued extending movement of the actuator piston, no further axial movement will be imparted to the nut 64, and hence the screw shaft 26 will not rotate. During release of the dog tooth type stroke end lock no shearing loads are imposed upon the dog teeth since there is only relative axial movement between the nut 64 and the annulus 62.

With particular reference to Figure 7, in the second embodiment the dog tooth locking member, having the radially expansible fingers is attached to the nut rather than to the piston. Thus, as seen in Figure 7, the piston 16 has a skirt portion 91 formed with an external dog tooth receiving groove 93. An annulus 94 is threadedly connected to the nut 64, the annulus 94 having external straight splines as indicated by numeral 96. The annulus 94 includes a plurality of circumferentially spaced radially expansible fingers 66 having dog teeth 68 at their ends which are engageable with the complementary groove 93 in the piston skirt 91, the straight spline teeth 96 on the annulus 94 engaging a complementary set of straight spline teeth 98 formed on the sleeve 100 having a flanged end 102 which is retained in fixed relation relative to the head cap 12.

The screw shaft 26 is identical to the screw shaft disclosed in the first embodiment, and thus is rotatably journalled in the head cap by ball bearing means 28. Likewise, the screw shaft has associated therewith unidirectional roller type locking means, as aforedescribed, whereupon rotation of the screw shaft 26 can be prevented when the actuator is in the fully retracted position with the stroke end lock engaged, as shown in Figure 7, in the absence of the application of fluid under pressure to the lock releasing cylinder for the roller locking means.

Operation of the actuator disclosed in Figure 7 is as follows. Upon application of fluid under pressure to the extend chamber 22 while the retract chamber 24 is connected to drain together with the simultaneous application of fluid under pressure to the roller lock releasing cylinder, the roller lock is released to permit rotation of the screw shaft 26 in the direction necessary to permit axial movement of the nut 64 and the piston 16 to the left. As the piston 16 and the nut 64 are moved to the left, the fingers 66 and the stroke end locking annulus 94 are free to expand radially towards the inner peripheral cylinder wall whereupon the dog teeth 68 will be disengaged from the corresponding groove 93 in the piston skirt 91. Axial movement of the annulus 94 and the nut 64 to the left, is positively limited by the cross pin 92 of the screw shaft, whereupon the piston 16 is free to reciprocate through the entire length of the cylinder 10. During disengagement of the stroke end lock, no shearing loads are imposed on the dog teeth 68 since there is no relative rotation between the dog teeth and the piston 16.

In both embodiments, to engage the stroke end lock with the actuator in an extended position, fluid under pressure is applied to the retract chamber 24 while the extend chamber 22 is connected to drain. The roller lock releasing means for the screw shaft will thus be engaged, however since the roller lock only prevents rotation of the screw shaft 26 in one direction, that direction corresponding to extending movement of the actuator piston 16, the actuator piston can be retracted and the screw shaft 26 can rotate in the opposite direction with the roller locking means engaged. In the embodiment of Figure 7, as the piston 16 approaches the fully retracted position, the piston head will abut the ends of the dog teeth 68 on the annulus 94 and thus impart axial movement to the annulus 94 and the nut 64, to the right. As the piston 16, the annulus 94 and the nut 64 move to the right, the locking fingers 66 will be moved radially inward due to coaction between the spline block 94 and the fingers 66 so that when the piston 16 arrives at the fully retracted position, as shown in Figure 7, the dog teeth 68 will be firmly engaged in the complementary groove 93 of the piston skirt 91. In the embodiment of Figure 1, the shoulder 70 engages the nut 64 and the edge 84 guides the dog fingers 66. As soon as the unidirectional roller lock associated with the screw shaft 26 is engaged, the rotation of the screw shaft 26 in the direction necessary to facilitate movement of the piston 16 to the left is precluded, and hence the piston 16 will be locked in the retracted stroke end position irrespective of the tension loads to which it is subjected.

While the embodiments of the invention as herein disclosed constitute preferred forms, it is to be understood that other forms might be adopted.

What is claimed is as follows:

1. A fluid pressure operated actuator including, a cylinder, a reciprocable piston disposed in the cylinder, a member rotatably journalled in said cylinder, a reciprocable and nonrotatable element engaging said member whereby reciprocation of said element is dependent upon and effects the rotation of said member, first releasable locking means operatively engageable with said member for preventing rotation thereof, and second releasable locking means operatively interconnecting said element and said piston at one stroke end of said piston for locking the piston against movement in one direction when said first locking means are engaged.

2. A fluid pressure operated actuator including, a cylinder, a reciprocable piston disposed in the cylinder capable of fluid pressure actuation in both directions, a member rotatably journalled in said cylinder, a reciprocable and nonrotatable element engaging said member whereby reciprocation of said element is dependent upon and effects rotation of said member, releasable unidirectional locking means operatively engaged with said member for preventing rotation thereof in one direction, and releasable locking means operatively interconnecting said element and said piston at one stroke end of said piston for locking said piston against movement in one direction when said unidirectional locking means are engaged.

3. A fluid pressure operated actuator including, a cylinder, a reciprocable piston disposed in the cylinder, a member rotatably journalled in said cylinder, a reciprocable and nonrotatable element engaging said member whereby reciprocation of said element is dependent upon and effects rotation of said member, unidirectional roller locking means engageable with said member for preventing rotation thereof in one direction, releasable locking means operatively interconnecting said element and said piston at one stroke end of said piston for locking said piston against movement in one direction when said unidirectional locking means are engaged, and means operable to release said unidirectional locking means to facilitate release of said last recited locking means upon the application of fluid under pressure to said cylinder to permit movement of said piston in said one direction.

4. A fluid pressure operated actuator including, a cylinder, a reciprocable piston disposed in the cylinder, a member rotatably journalled in said cylinder, a reciprocable and nonrotatable element engaging said member whereby reciprocation of said element is dependent upon and effects rotation of said member, unidirectional locking means operatively engageable with said member for preventing rotation thereof in one direction, releasable dog tooth type locking means operatively interconnecting said element and said piston at one stroke end of said piston for locking the piston against movement in one direction when the unidirectional locking means are engaged, and means operable to release said unidirectional locking means upon the application of fluid under pressure to said cylinder to facilitate the release of said dog tooth type locking means and permit movement of said piston in said one direction.

5. A fluid pressure operated actuator including, a cylinder, a reciprocable piston disposed in the cylinder, a member rotatably journalled in said cylinder, a reciprocable and nonrotatable element engaging said member whereby reciprocation of said element is dependent upon and effects rotation of said member, unidirectional roller type locking means operatively engageable with said member for preventing rotation thereof in one direction, releasable dog tooth type locking means operatively interconnecting said element and said piston at one stroke end of said piston for locking the piston against movement in one direction when said unidirectional locking means are engaged, and means operable to release said unidirectional locking means upon the application of fluid under pressure to said cylinder to facilitate the release of said dog tooth type locking means and permit movement of said piston in said one direction.

6. The actuator set forth in claim 5 wherein said unidirectional roller type locking means comprise a nonrotatable cam having a plurality of peripheral flats terminating in abrupt shoulders, a locking collar integral with said member and radially spaced from the periphery of said cam, a roller mounted on each flat between said cam and said locking collar, and a spring engaging each roller and biasing it into wedging engagement with said cam and said locking collar.

7. The actuator set forth in claim 6 wherein the means operable to release said unidirectional locking means comprise an angularly movable lock releasing member having a plurality of fingers disposed between said locking collar and said cam, and fluid pressure operated piston means for imparting angular movement to said lock releasing member whereby said fingers engage said rollers and move said rollers out of wedging engagement with said cam and said locking collar.

8. The actuator set forth in claim 5 wherein said dog tooth type locking means comprises a sleeve attached to said piston having a plurality of circumferentially spaced radially expansible fingers having dog teeth adjacent their ends.

9. The actuator set forth in claim 8 wherein said element includes a complementary dog tooth engaging shoulder, and wherein said actuator includes means for compressing and guiding said fingers into engagement with the complementary dog tooth engaging surface of said element.

10. The actuator set forth in claim 5 wherein said dog tooth type locking means includes a sleeve attached to said element and having a plurality of circumferentially spaced radially expansible fingers having dogs teeth adjacent their ends.

11. The actuator set forth in claim 10 wherein said piston includes a skirt having a dog tooth receiving groove.

12. The actuator set forth in claim 5 wherein said piston divides said cylinder into an extend chamber and a retract chamber, wherein said means operable to release said unidirectional locking means includes a fluid pressure operated lock releasing piston disposed within a lock releasing cylinder, and wherein said lock releasing cylinder and said extend chamber are interconnected whereby said lock releasing piston will be actuated automatically upon the application of fluid under pressure to said extend chamber.

13. An actuator assembly including, a cylinder, a reciprocable piston disposed in said cylinder, a screw shaft rotatably journalled in said cylinder, a reciprocable and nonrotatable nut engaging said screw shaft whereby reciprocation of said nut is dependent upon and effects rotation of said screw shaft, releasable unidirectional locking means engageable with said screw shaft for preventing rotation thereon in one direction, and releasable locking means operatively interconnecting said nut and said piston at one stroke end of said piston for locking said piston against movement in one direction when said unidirectional locking means are engaged.

14. An actuator assembly including, a cylinder, a reciprocable piston disposed in said cylinder, a screw shaft rotatably journalled in said cylinder, a reciprocable and nonrotatable nut engaging said screw shaft whereby reciprocation of said nut is dependent upon and effects rotation of said screw shaft, first releasable locking means engageable with said member for preventing rotation thereof, and second releasable locking means operatively interconnecting said nut and said piston at one stroke end of said piston for locking the piston against movement in one direction when said first locking means are engaged.

15. An actuator assembly including, a cylinder, a reciprocable piston disposed in said cylinder, a screw shaft rotatably journalled in said cylinder, a reciprocable and nonrotatable nut engaging said screw shaft whereby reciprocation of said nut is dependent upon and effects rotation of said screw shaft, releasable, unidirectional, roller type locking means engageable with said screw shaft for preventing rotation thereof in one direction, and releasable dog tooth type locking means operatively interconnecting said nut and said piston at one stroke end of said piston for locking said piston against movement in one direction when said unidirectional locking means are engaged.

16. The actuator assembly set forth in claim 15 including resilient means engaging said nut for urging said nut towards the outer end of said screw shaft.

17. The actuator assembly set forth in claim 15 wherein said screw shaft has a cross pin extending therethrough adjacent the outer end thereof, said cross pin being engageable with said nut when the nut is moved to the outer end of said screw shaft to prevent disengagement between said nut and said screw shaft and to limit the travel of said nut.

18. The actuator set forth in claim 15 wherein said dog tooth type locking means includes a sleeve having a plurality of circumferentially spaced radially expansible fingers having dog teeth adjacent their ends.

19. The actuator assembly set forth in claim 18 wherein said sleeve is attached to said nut and wherein said sleeve has a straight spline connection with said cylinder so as to preclude rotation of said sleeve and said nut relative to said cylinder.

20. The actuator assembly set forth in claim 18 wherein said sleeve is attached to said piston, and wherein said nut includes a plurality of longitudinally extending circumferentially spaced teeth engageable with a complementary set of circumferentially spaced teeth attached to said cylinder so as to preclude rotation of said nut relative to said cylinder.

References Cited in the file of this patent

UNITED STATES PATENTS

| | | |
|---|---|---|
| 2,221,979 | Levy | Nov. 19, 1940 |
| 2,702,024 | Harold | Feb. 15, 1955 |
| 2,705,939 | Geyer | Apr. 12, 1955 |
| 2,815,005 | Geyer | Dec. 3, 1957 |
| 2,851,995 | Westcott | Sept. 16, 1958 |
| 2,887,091 | Martin et al. | May 19, 1959 |
| 2,898,888 | Geyer | Aug. 11, 1959 |

FOREIGN PATENTS

| | | |
|---|---|---|
| 443,871 | Great Britain | Mar. 5, 1936 |